Patented Oct. 19, 1937

2,096,549

UNITED STATES PATENT OFFICE 2,096,549

PREPARATION OF MALTOSE AND DEX-
TRINS

Vernon Jersey, Cleveland, Ohio, assignor to
S. M. A. Corporation, Cleveland, Ohio, a corporation of Ohio No Drawing. Application June 14, 1933,
Serial No. 675,714

10 Claims. (Cl. 99—27)

The present invention relates to methods of making an improved malted product containing reducing sugars and non-reducing sugars and characterized by the absence of proteins capable of producing allergic reactions in protein-sensitive individuals, and to the product of such methods. More particularly, the invention relates to a method of malting starchy materials in such a manner that the protein naturally occurring in the starchy materials is removed or rendered innocuous.

It is well known in medicine that infinitesimally small amounts of certain proteins when ingested as a food or with food materials, may produce serious effects, such as eczema, urticaria, asthma, digestive upsets and other more or less violent disturbances. These effects are peculiar in that they are produced only in certain individuals, who are said to be hypersensitive or allergic to the given protein. Some persons are hypersensitive to the proteins of wheat, eggs, milk, etc., while others may be hypersensitive to several different proteins at one and the same time. It has been proposed to render a given protein, to which a certain individual may be allergic, innocuous by altering or denaturizing the protein, the degree of alteration or denaturization required depending on the degree of hypersensitivity shown by the given individual.

In the preparation of a malted product, proteins occur naturally in the raw materials, starch and malt, used in the process of producing a mixture of maltose and dextrins. Such proteins, if left in the finished product, render the same poisonous to protein-sensitive persons and this objectionable feature becomes particularly serious where the product is to be used in compounding baby foods. It is, accordingly, an object of the present invention to provide a method of preparing a mixture of reducing sugars and non-reducing sugars from starch in such manner that the final product shall not contain proteins. Another object of the invention is to provide an improved protein-free malted product. Other objects of the invention will in part be obvious and will in part appear hereinafter.

The process utilizes as a starting material, the commercially available starches, such as those of potatoes, cassava, rice, wheat, corn, etc. To the starch is added malted grain, such as barley malt or wheat malt, containing the amylytic enzymes for the saccharification of the starch as well as proteolytic enzymes, for the hydrolysis of the proteins. The process contemplates disposing of the naturally occurring proteins in the starchy material and the malted grain so as to render these innocuous to persons ordinarily allergic to them, by a combination of the following steps: (a) heating to specified temperatures for definite periods of time; (b) the enzymic proteolytic hydrolysis of the proteins present; and (c) a regulation and control of the acidity of the solution containing the proteins within a specified range of hydrogen ion concentration. The heating steps are carried out so as in part to alter the nature of some of the proteins to render them insoluble and in part to cause chemical changes in the complex molecules of the proteins remaining in solution calculated to change their toxic nature as determined by anaphylactic tests.

Since the aim of the invention is to remove all traces of naturally occurring proteins to which protein-sensitive individuals might react, these may be removed by any step or series of steps which will leave an edible product having other desired characteristics. Thus, proteolytic enzymes are used to hydrolyze, as far as possible, only such proteins as are soluble, that portion which is hydrolyzable being also, for the most part, the portion which is soluble. Insoluble and coagulable proteins are, on the other hand, precipitated and removed by filtration rather than by hydrolysis. In this way, the duration and expense of the process may be reduced owing to the fact that hydrolysis is carried on only to the extent necessary to denaturize proteins not removable by precipitation and filtration. In fact, the total time of enzymic action in my process, both proteolytic and hydrolytic, may be reduced to about ninety minutes, which is little more than the time required in ordinary brewing of malt liquors when no protein rest period, for solubilizing of proteins by proteolytic action, is provided.

The process in its entirety includes the addition of malted grain to a quantity of starchy material in suspension, the maintenance of the temperature of the suspension at a point found to be most favorable for enzymic action in this process until starch is no longer present, heating to the boiling point to precipitate coagulable albumins, cooling and adding additional malt for the production of more reducing sugars, further heating and precipitation, and filtration. I have found, however, that the conditions under which these operations are carried out, particularly as regards temperature and acidity of the suspension, should be maintained within certain limits for best results and reduced time of reaction. Thus, while it has been proposed to conduct the proteolysis of proteins in an acid medium ranging from pH 4.3 to 5.0 at a temperature of about 40° C. with a stated loss of activity at a temperature of 60° C., it has been found, according to the present invention, that higher temperatures, ranging between 55° and 75° C. may be used provided the acidity of the suspension of starch and malt is maintained between pH 6.0 and 6.6. The reason for this behavior is not known but it is supposed that the activity of the proteolytic enzymes may be preserved at higher temperatures than normal when the working medium is made less acid. Obviously, the use of higher temperatures increases the speed of the reaction, provided the enzymes are not destroyed by the higher temperatures, and this is important from the point of view of industrial yields. The efficiency of the process is further increased by the boiling step outlined above which results in the coagulation and precipitation of filterable proteins which, consequently, do not require to be acted upon by the proteolytic enzymes. The ultimate result of the process is a mixture of reducing and non-reducing sugars containing a minimum amount of nitrogen compounds and not responding to Heller's ring test for proteins nor to the potassium ferrocyanide test commonly used by physicians for the identification of soluble proteins.

As an illustration of the process as actually carried on, the following example is given: A quantity of commercially available starch, preferably the purest obtainable, although less pure forms may also be used, is suspended in a suitable quantity of water and wheat or barley malt, or other material containing diastatic and proteolytic enzymes, is added. Specifically, potato starch and malt in the proportions of one part of malted grain to 250 to 400 or even 450 parts of starch, depending on the Lintner value of the malt, are suspended in water in amount sufficient to prevent the formation of lumps. The acidity of the suspension is adjusted to a hydrogen ion concentration of pH 6.0 to 6.6 and the suspension thoroughly agitated while the temperature is raised during twenty minutes to 70° C. During this time, the liquefying enzymes become active, with the result that the heavy mass gradually thins. The temperature is maintained at 75° C. until the iodine test shows that starch is no longer present. The whole is then heated to the boiling point in order to break down any starch particles not yet ruptured and to precipitate the coagulable albumins. The entire mass may be held at the boiling point for a considerable time to bring about further denaturizing of the proteins, or the heat may be shut off and the mass allowed to cool slowly to 70° C. over a period of twelve hours to bring about this thermal denaturization.

After cooling again to 70° C., a small amount of malt, or other diastatic material, is added and the diastatic action allowed to proceed to any desired reducing sugar content; for example, equal parts of reducing sugars and dextrins, whereupon the reaction mass is raised to a temperature optimum for the precipitation of the remaining coagulable proteins and high enough to destroy all enzymes; a temperature of 90° C. has been found suitable for this purpose. Higher temperatures than this bring about a dispersion of the protein and render it more difficult to separate such protein completely. The mass is now filtered to separate the precipitated protein and the protein-free liquid may be condensed to a syrup and used as such. Preferably, however, the syrup is reduced to a dry powder by suitable drying apparatus, such as a spray powder mill, for convenience in handling and economy of transportation.

It is found that the product obtained by the foregoing procedure is much less hygroscopic than products of similar carbohydrate composition produced by known methods and this fact makes the product of particular value for use as a milk modifier, since it is sterile, when properly protected, and has no tendency to cake in the can even when left exposed to the moist atmosphere of the room. Most important of all, the protein-free product may be used by persons sensitive to specific proteins without producing allergic reactions.

In the foregoing process, the diastatic or amylytic enzyme contained in the malted grain reduces the starch of the potato, cassava, rice, corn, etc., to a mixture of reducing and non-reducing sugars, such as maltose and dextrins, while the proteolytic enzymes, also contained in the malt, reduce soluble proteins naturally occurring in the starch source and not separable from commercial sources of starch, to non-allergic forms; perhaps in part to proteoses and amino acids. Proteins have thus been broken down in other industrial processes, such as the beer-making art, in which a protein rest period is provided to permit the proteolytic enzymes to break down protein material far enough so that the beer will not become cloudy when chilled in the bottles. This procedure is, however, carried out at a temperature of about 20° to 50° C., for a period ranging from one-half to one hour. No attempt is made to control the acidity of the batch within a narrow pH range nor is it an object to precipitate protein during the process. In contradistinction to this, the present invention comprises a method in which the proteolytic enzymes are caused to react on the protein constituents of the starchy material at temperatures ranging much higher, say from 55° to 75° C., and this is done in a medium of carefully adjusted acidity, i. e., in a medium having an acidity of pH 6.0 to 6.6. Furthermore, such proteolytic alteration of soluble proteins in the starch suspension is combined with a boiling operation to coagulate and precipitate other proteins amenable to removal by such means. The combination of steps in the malting of starch to a mixture of reducing sugars and dextrins results in a product freed from proteins either by denaturization of non-precipitable species by proteolysis or by precipitation and mechanical removal of coagulable species. The product, due to the absence of proteins, is, consequently, non-toxic to persons sensitive to any specific protein whatever or in any amount.

The method set forth above is also applicable to the treatment of previously formed mixtures of sugars resulting from the conversion of starchy materials, proteolytic enzymes being added to such mixtures and the mass then being heated to denaturize soluble proteins and subsequently brought to the boiling point to precipitate coagulable proteins. The product is then filtered to remove the precipitated proteins.

What I claim is:

1. The method of preparing a malted product which comprises, adding malt to a suspension of starchy material, adjusting the acidity of the suspension to about pH 6.0 to 6.6, maintaining the temperature at about 55° to 75° C. until starch is no longer present and soluble proteins have been denaturized, heating to boiling, and filtering to separate insoluble proteins.

2. The method of preparing a malted product which comprises, adding malt to a suspension of starchy material, adjusting the acidity of the suspension to about pH 6.0 to 6.6, maintaining the temperature at about 75° C. until starch is no longer present and soluble proteins have been denaturized, heating to boiling, and filtering to separate insoluble proteins.

3. The method of preparing a malted product which comprises, adding malt to a suspension of starchy material, adjusting the acidity of the suspension to about pH 6.0 to 6.6, maintaining the temperature at about 55° to 75° C. until starch is no longer present and soluble proteins have been denatured, heating to boiling and cooling to a point within the foregoing temperature range to further denaturate soluble proteins, adding a further quantity of malt and maintaining the temperature at such a point within said range for a sufficient length of time to produce an increased quantity of reducing sugars, raising the temperature to precipitate insoluble proteins, and filtering.

4. The method of preparing a mixture of reducing and non-reducing sugars which comprises, adding malt to a suspension of starchy material, adjusting the acidity of the suspension to about pH 6.0 to 6.6, maintaining the temperature at about 75° C. until starch is no longer present and soluble proteins have been denaturized, heating to boiling to precipitate coagulable proteins and cooling to about 70° C. to further denaturize soluble proteins, adding a further quantity of malt to produce an increased quantity of reducing sugars, raising the temperature to about 90° C. to precipitate remaining coagulable proteins, and filtering.

5. In the method of preparing a malted product, the steps which comprise adding malt to a suspension of a starchy material, adjusting the acidity to about pH 6.0 to 6.6, and maintaining the temperature at about 55° C. to 75° C. for a sufficient length of time to convert the starch into a mixture of sugars and to denaturize the soluble proteins so as to render them innocuous to protein sensitive people.

6. In the method of preparing a malted product by the action of malt on a suspension of starchy material, the step which comprises adjusting the acidity to about pH 6.0 to 6.6 and maintaining the temperature at 55° C. to 75° C. for a sufficient length of time to denaturize the soluble proteins so as to render them innocuous to protein sensitive people.

7. The method of preparing a carbohydrate product which comprises treating converted starchy materials containing proteins with malt, adjusting the acidity to about pH 6.0 to 6.6, and maintaining the temperature at 55° C. to 75° C. for a sufficient length of time to denaturize the soluble proteins so as to render them innocuous to protein sensitive people.

8. The method of treating commercially pure starch which comprises adding a malt containing diastatic and proteolytic enzymes to a suspension of the starch, adjusting the acidity of the suspension to about pH 6 to 6.6 and heating at a temperature of 55° to 70° C. for a sufficient length of time to convert most of the starch into sugar, heating the mass to the boiling point to break up particles of starch and to coagulate insoluble proteins, maintaining the mass at approximately the boiling temperature for a considerable length of time to denaturize soluble proteins, reducing the temperature to from 55° to 70° C., adding additional malt, continuing the malting operation to form a mixture of sugar, and then filtering to remove insoluble proteins.

9. The method of treating commercially pure starch which comprises adding a malt containing diastatic and proteolytic enzymes to a suspension of the starch, adjusting the acidity of the suspension to about pH 6 to 6.6 and heating at a temperature of about 55° to 70° C. for a sufficient length of time to convert most of the starch to sugar, heating the mass to the boiling point to break up particles of starch and to coagulate insoluble proteins, maintaining the temperature at approximately the boiling point for a sufficient length of time to denaturize soluble proteins, adding additional malt and continuing the malting operation to form a mixture of reducing and non-reducing sugars, and then filtering to obtain a product which is substantially free from proteins.

10. The method of treating commercially pure starch which comprises adding a malt containing diastatic and proteolytic enzymes to a suspension of starchy material, adjusting the hydrogen ion concentration of the suspension to about pH 6 to 6.6 and heating at a temperature of approximately 55° to 70° C. for a sufficient length of time to convert most of the starch into sugar, heating the mixture to the boiling point to coagulate insoluble proteins and break up particles of starch, cooling the mass slowly from the boiling point to 70° C. to denaturize soluble proteins, adding additional malt and heating at a temperature of approximately 55° to 70° C. to reduce the starch to sugar and then raising the temperature to approximately 90° C. and filtering to remove insoluble proteins.

VERNON JERSEY.